V. O'N. WATKINS.
EDUCATIONAL BOARD.
APPLICATION FILED MAY 20, 1920.
1,406,592.
Patented Feb. 14, 1922.
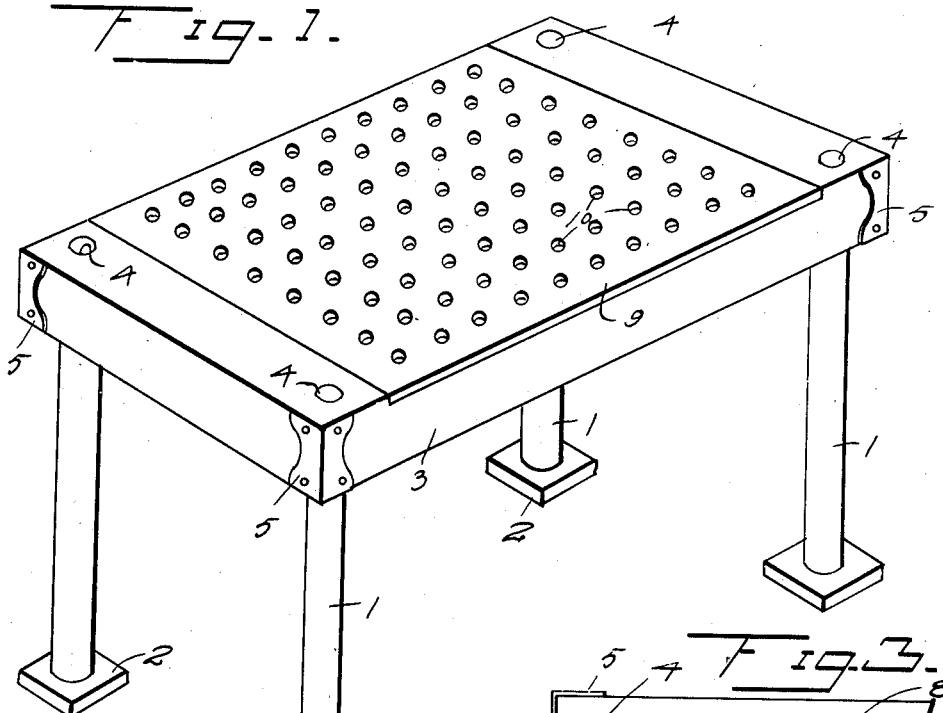
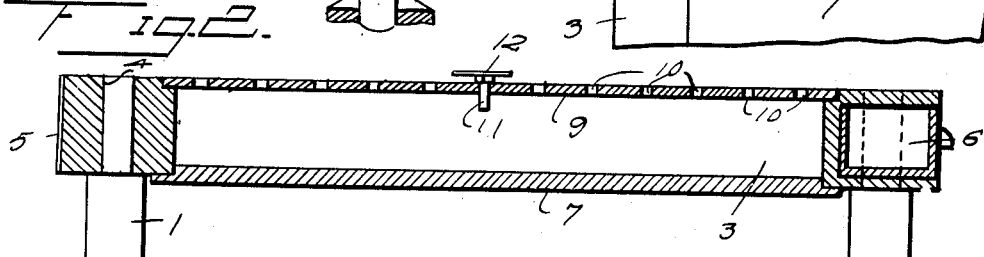
INVENTOR.
V. O'N. Watkins
BY
ATTORNEY.

UNITED STATES PATENT OFFICE.

VERNA O'NEAL WATKINS, OF ATLANTA, GEORGIA.

EDUCATIONAL BOARD.

1,406,592. Specification of Letters Patent. Patented Feb. 14, 1922.

Application filed May 20, 1920. Serial No. 382,839.

*To all whom it may concern:*

Be it known that I, VERNA O'NEAL WATKINS, a citizen of the United States, residing at Atlanta, in the county of Fulton and State of Georgia, have invented certain new and useful Improvements in Educational Boards; and I do hereby declare the following to be a full, clear, and exact description of the invention, such as will enable others skilled in the art to which it appertains to make and use the same.

This invention relates to educational boards and it consists in the novel features hereinafter described and claimed.

An object of the invention is to provide a board of simple and durable form especially adapted to be used for teaching children how to arrange the figures and objects upon a support in accord with the theme of a story which is being read to them, there being means provided whereby the objects and figures after they have been arranged in proper relation with respect to each other and in accord with the theme of the story whereby the said objects and figures may be drawn in the form of a picture which may illustrate a climax of the story.

With this object in view the educational board comprises a tray of rectangular form provided at its corner portions with openings adapted to receive the upper parts of legs when the tray is set up in the form of a table. One exposed surface of the tray is black and may be used as a blackboard when the illustration is being drawn. The opposite side of the tray is provided with a vast number of perforations and is detachable from the body of the tray. The tray is provided with a removable drawer which may retain figures and pegs which are insertable in the openings provided in the detachable part of the body. Thus the figures may be positioned upon the board and arranged in accord with the theme of the story.

In the accompanying drawing:

Figure 1 is a perspective view of the educational board.

Figure 2 is a longitudinal sectional view of the same.

Figure 3 is a fragmentary plan view of the same.

Figures 4, 5 and 6 are views of figures which may be used upon the board.

The educational apparatus comprises legs 1 which are adapted to fit at their lower ends in plates 2 which may be mounted upon the floor or other support. The educational board also includes a tray 3 in the form of a rectangular body and provided at its corner portions with openings 4 adapted to receive the upper portions of the legs 1. The legs 1 may be inserted in either end of the openings 4, thus either side of the tray 3 may serve as the upper surface of the table. Corner plates 5 are applied to the corners of the tray 3 and serve to brace the structure. A drawer 6 is detachably mounted in one end of the tray 3 and may retain figure pieces hereinafter described. One exterior surface 7 of the tray 3 is black and may be used as a black board and the said surface is provided with a groove 8 in which chalk may be retained. A panel 9 may serve as the opposite side of the tray body 3 and the said panel is provided with a vast number of perforations 10 which pass transversely through the said panel. The panel 9 may be detached from the tray 3. Pegs 11 may be inserted in the openings 10 and the said pegs may be circular, square, rectangular or triangular in transverse section as desired. Figures 12 are mounted upon these pegs 11 and these figures may represent animals, people, fowls, or other objects and they may be formed from wood, metal or any other suitable material.

In practice, the teacher reads a story to the pupils and the pupils apply the figures and objects upon the pegs in the openings 10 provided in the panel 9. The said panel may then be removed from the tray 3 and placed at a distance and the figures and objects may be drawn upon the blackboard surface 7 by using ordinary chalk. Thus the climax of a story may be illustrated by the pupils who hear the story read to them.

From the foregoing description taken in conjunction with the accompanying drawing it will be seen that an educational apparatus of simple structure is provided and that the same may be used to advantage for teaching children to arrange the objects and figures which are described in a story in a form of a setting as the said objects and figures are introduced in the theme of the story and at such times as the climaxes are reached in the story. Also the device may be used to advantage as a model for retaining the objects and figures before the pupils in their proper relative positions when a drawing is being made to illustrate the climax of a story.

It is to be understood that minor changes in structure and arrangement may be resorted to provided the alterations and changes do not depart from the spirit of the invention as claimed.

Having described the invention, what I claim is:

1. An educational appliance comprising a supporting member, a plurality of objects, a panel movably supported on one face of said member to which the objects may be applied in an upstanding position in connection with a story, a drawing board carried by said member on the opposite face to the panel, said member being adjustable to present the drawing board in a utile position after application of the objects, and the movability of the panel enabling disposition thereof into a position relative to the drawing board to display the objects for graphic reproduction on the drawing board in furtherance of the story.

2. An educational appliance comprising a supporting member having end bars with apertures therethrough, legs to removably enter the apertures, a plurality of objects, a panel removably supported on one face of said member to which the objects may be applied in connection with a story, a drawing board on the opposite face of said member to the panel, the removability of the panel enabling disposition thereof at a distance from the member, said member being reversible to present the blackboard uppermost after removal of the panel to facilitate graphic reproduction of the objects in furtherance of the story.

In testimony whereof I affix my signature in presence of two witnesses.

VERNA O'NEAL WATKINS.

Witnesses:
  Mrs. J. C. MELSON,
  H. B. TERRELL.